J. K. LEEDY.
Lamp.
No. 26,910.
Patented Jan'y 24, 1860.
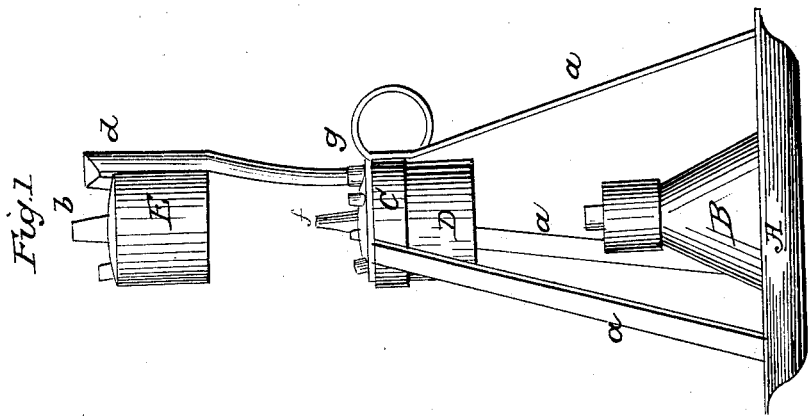
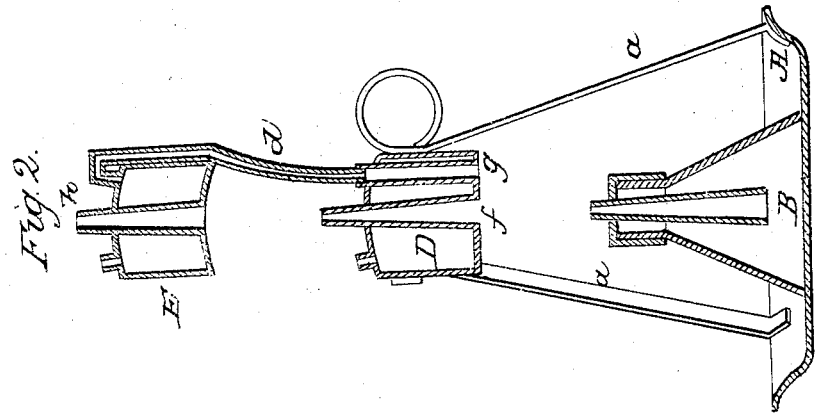

UNITED STATES PATENT OFFICE.

JOHN K. LEEDY, OF WOODSTOCK, VIRGINIA.

LAMP.

Specification of Letters Patent No. 26,910, dated January 24, 1860.

*To all whom it may concern:*

Be it known that I, JOHN K. LEEDY, of Woodstock, in the county of Shenandoah and State of Virginia, have invented certain new and useful Improvements in Lard-Lamps; and I do hereby declare that the following is a full, clear, and exact description of the same, reference being had to the accompanying drawings and the letters of reference marked thereon.

The nature of my invention consists in placing a vessel containing water above the flame of the lamp and connecting said vessel to the lamp by means of a tube or pipe, through which steam is designed to pass, for the purpose of keeping the lard in a liquid state.

In the annexed drawings Figure (1) represents a sectional view. Fig. (2) is a side elevation.

In Fig. (1) A represents a plate in the center of which is placed an alcohol lamp (3). The object of this lamp will me more fully seen hereafter.

(*a a a*) are three supports, which are secured at equal intervals, near the periphery of plate (A). Said supports incline toward each other at their tops.

(*c*) represents a band which is secured between the upper ends of supports (*a a a*).

(D) represents the lard lamp,—through which the copper tube (*f*) passes, as shown in Fig. (2), said tube being larger at the bottom than at the top. (*g*) is also a tube which extends through the lamp (D). The object of this tube will be clearly seen hereafter.

(E) represents a cup for the reception of water, said cup is provided with a copper tube (*h*) which extends up through its center as shown in Fig. (2). The bottom of cup (E) is convex in order more perfectly to collect the heat from the blaze of the lamp beneath. (*d*) is a pipe which connects the lamp (D) with the cup (E), said pipe (*d*) enters the tube (*g*) thus affording a support to cup (E).

The operation of my invention is as follows: Alcohol is placed in the lamp (B), lard in the lamp (D) and water in the cup (E). In order to light the lamp (D) when the lard is congealed, I first light the alcohol lamp (B), which heats the lard, and converts it into a fluid. The lamp (D) may then be lighted, and the lamp (B) extinguished. The pipe (*d*) being properly adjusted, as shown in the drawings, the flame from the lamp (D) will generate steam in the cup (E), which will be conducted down in the tube (*g*) by means of pipe (*d*), and thus heat the oil very hot. The tube (*g*) may be made spiral, thus affording a greater surface for the steam to exert its influence on the water in cup (E). The object in using said cup is the economy with which I can keep the lard in a state to be burned and thus dispense with the necessity of using a more costly material to effect the same object.

Having thus fully described my invention, what I claim and desire to secure by Letters Patent is—

The arrangement of the alcohol lamp (B) the oil lamp (D), and the water cup (E), said cup being provided with one, and the lamp (D) with two independent tubes, which pass through them, the cup being situated above the lamp (D) and connected with it by means of a steam pipe (*d*) which passes into the tube (*g*), the whole being used substantially as and for the purpose specified.

JOHN K. LEEDY.

Witnesses:
T. H. ALEXANDER,
M. V. R. RADCLIFF.